Sept. 23, 1930.  W. R. HOBBS  1,776,559
CAR DOOR LOCK FOR RAILWAY BOX CARS
Filed Sept. 13, 1929   2 Sheets-Sheet 2
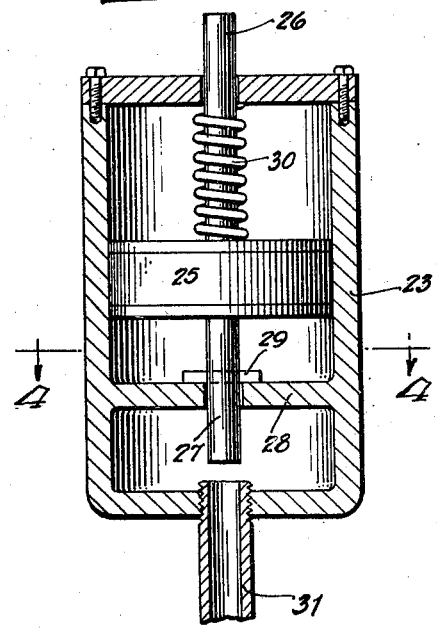
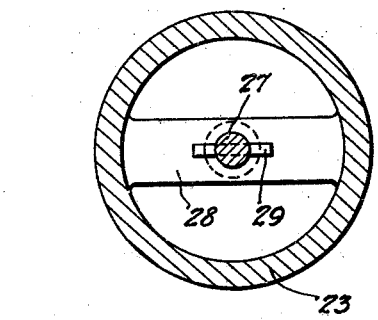
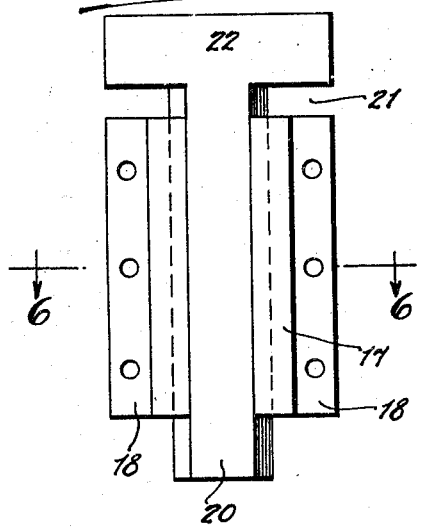
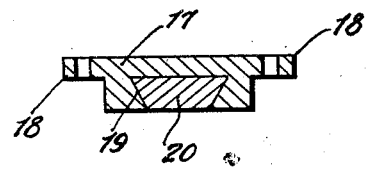
Inventor
WILLIAM R. HOBBS.
By *Clarence A. O'Brien*
Attorney Patented Sept. 23, 1930

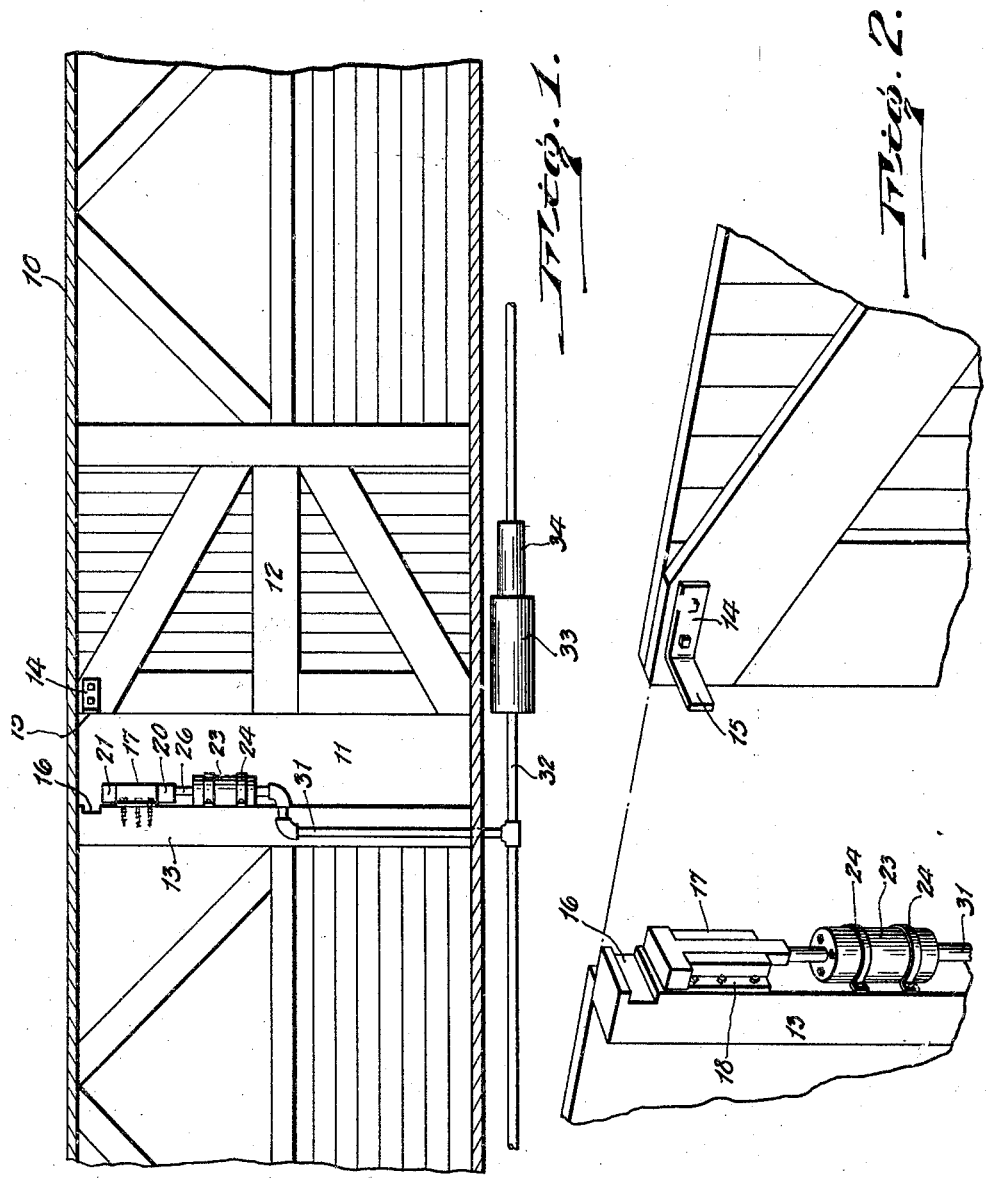

1,776,559

UNITED STATES PATENT OFFICE

WILLIAM R. HOBBS, OF EAST ST. LOUIS, ILLINOIS

CAR-DOOR LOCK FOR RAILWAY BOX CARS

Application filed September 13, 1929. Serial No. 392,402.

This invention relates to improvements in car door locks for railway box cars.

The primary object of the invention resides in a car door lock which is automatically operable by the variance of the brake pipe pressure in the air brake system of a train and which is controlled by the engineer of the train.

Another object is to provide a pneumatic railway car door lock which is held open by the action of a spring of a predetermined tension and which is movable to a closed position by the brake pipe pressure overcoming the tension of the spring, whereby reduction of the brake pipe pressure below the spring tension will cause the lock to open to permit access to the interior of the car through the usual sliding door.

A futher object of the invention is the provision of a car door lock controlled by the reduction and building up of brake pipe pressure by which the car doors of a freight train may be opened and closed when desired and which will be found extremely convenient in use on local freight and baggage cars where the doors are unlocked upon arriving at a station stop to take on freight and baggage, and locked when leaving the station.

A still further object is to provide a pneumatic car door lock which is installed within the car to prevent tampering with the same from the outside, and which may be installed on freight cars now in use at a nominal cost as there are no changes necessary in the construction of the present type of car.

With these and other objects in view, the invention resides in certain novel construction, combination and arrangement of parts, the essential features of which are hereinafter fully described, are particularly pointed out in the appended claims, and are illustrated in the accompanying drawings, in which:

Figure 1 is a vertical longitudinal sectional view through a box car showing my improved pneumatic lock installed thereon and showing the sliding door in an open position.

Figure 2 is a detail perspective view of my improved lock showing the parts in an open position.

Figure 3 is a detail enlarged vertical sectional view through the actuating cylinder.

Figure 4 is a horizontal sectional view on the line 4—4 of Figure 3.

Figure 5 is a detail front elevational view of the T-shaped bolt and its supporting bracket.

Figure 6 is a horizontal sectional view on the line 6—6 of Figure 5.

Referring to the drawings by reference characters, the numeral 10 designates a fragmentary portion of a freight or box car of the ordinary construction which includes a side door opening 11 closed by a sliding door 12, which door closes against a vertical stile or jamb 13. Fixed to the inside of the door 12 flush with the side edge thereof is an angle bracket 14, the inwardly extending flange 15 of which seats in a transversely disposed recess 16 in the side face of the jamb when the door 12 is moved to a closed position. The flange 15 therefore assumes a position flush with the side of the door jamb for a purpose to be hereinafter appreciated.

Fixedly mounted to the inner side of the jamb 13 directly beneath the recess 16 is a bracket 17 having attaching flanges 18 through which bolts or like fastening elements 19 pass for securing the same to the door jamb 13. The bracket 17 is provided with a dovetailed channel 19 as shown in Figure 6 of the drawings for slidably receiving the dovetailed shaped shank 20 of a T-shaped bolt 21. The shank 20 of the bolt is longer than the length of the bracket 17 so that the lower end of the shank projects below the bracket when the cross head 22 is seated down against the top of the bracket, which position the bolt will assume due to weight of the same and the force of gravity. When the head is in such position the top of the same is disposed below the recess 16 as clearly shown in Figures 1 and 2 of the drawing. The head 22 is of a width approximating the width of the recess 16 so as to overlie the flange 15 of the bracket 14 when the door 12 is in a fully closed position.

Also mounted to the inner side of the door jamb 13 is a cylinder 23 secured thereto by a bracket 24 so that the axis of the cylinder is in alinement with the shank 20 of the bolt 21. Slidable within the cylinder 23 is a piston head 25 from one side of which a piston rod 26 extends through one of the end walls of the cylinder and which terminates directly beneath the bottom of the shank 20. A guide rod 27 extends from the opposite side of the piston head 25 and is slidably mounted in a spider or bearing 28 disposed above the bottom end of the cylinder and which guide rod is provided with a transversely extending pin 29 for abutting engagement with the spider to limit downward movement of the piston head within the cylinder. An expansion spring 30 encircles the piston rod 26 and is interposed between the top wall of the cylinder and the adjacent side of the piston head 25. This spring 30 tends to hold the piston rod 26 in a retracted position while the pin 29 acts as a stop for limiting downward movement of the piston and its corelated parts. Entering the lower end wall of the cylinder is an air inlet pipe 31 which is connected to the brake line pressure pipe 32 of the air brake system of a train and which system also includes the usual auxiliary reservoir 33 and the brake cylinder 34. In air brake systems it is usually the practice to maintain a predetermined brake line pressure within the system and for the sake of illustration assume that the spring 30 has a tension less than the maximum brake line pressure. When the pressure in the brake line 32 is built up to the maximum pressure, the said air pressure entering the cylinder 23 through the pipe 31 will overcome the tension of the spring 30 and will therefore actuate the piston head 25 to extend the piston rod 26 upwardly and due to the fact that the lower end of the T-shaped bolt 21 is disposed in the path of upward movement of the piston rod, the said bolt will slide upwardly to a plane in alinement with the recess 16 in the jamb, and assuming that the door 12 is in a closed position with the inwardly extending flange 15 of the bracket 14 seated in the recess 16, the head 22 of the said bolt will overlie the flange 15 thus locking the door 12 in a closed position. This built up maximum pressure in the brake line is maintained during movement of the train as it is by this pressure that the brakes of the train are held in released position, but when the brake line pressure is reduced to apply the brakes of the train when desired to bring the train to a stop, a reduction of brake line pressure will allow the spring 30 to move the piston and the piston rod 26 to a retracted position and due to the weight of the T-shaped bolt and the force of gravity, the said bolt will drop to an unlocked position out of the path of the flange 15 of the bracket 14. The door 12 may now be moved to an open position to gain access to the interior of the box car for loading and unloading purposes.

From the foregoing description, it will be appreciated that a pneumatically controlled lock mechanism of the kind described will be found most useful in box cars and baggage cars making up a train required to stop at local stations to pick up and discharge freight and baggage as the said lock mechanism is automatically controlled by the brake line pressure of the air brake system and which is subject to the stopping and starting of the train due to the reduction and successive increase in the brake line pressure. By mounting the device on the side of the car, the same is protected from tampering when the car is in motion.

Having thus described the invention, what I claim as new and desire to secure by Letters Patent is:—

1. In a railway car having a sliding door for movement to a closed position against a jamb, a bracket fixed to said door for engagement with said jamb when said door is closed, a bolt slidably mounted on said jamb for vertical sliding movement and normally disposed out of the path of said bracket by reason of its own weight, and pneumatic means for lifting said bolt to overlie said bracket to lock said door against sliding movement.

2. In a railway car having a sliding door for movement to a closed position against a jamb, a bracket fixed to said door for engagement with said jamb when said door is closed, a bolt slidably mounted on said jamb for vertical sliding movement and normally disposed out of the path of said bracket by reason of its own weight, pneumatic means for lifting said bolt to overlie said bracket to lock said door against sliding movement, said pneumatic means including a cylinder, a piston slidable in said cylinder and engageable with said bolt, and spring means acting upon said piston to normally hold the same in a retracted position, and an air pressure pipe entering said cylinder on one side of said piston to introduce air under pressure into said cylinder in excess of the tension of said spring means to move said piston to an extended position to lift said bolt to a locking position.

3. In a railway car having a sliding door and a jamb, an angle bracket secured to the inside of said door for reception in a recess in said jamb when said door is closed thereagainst, a bolt slidably mounted on said jamb for vertical movement and normally disposed below the plane of said recess by reason of its own weight, a cylinder mounted on said jamb beneath said bolt, a piston within said cylinder and extending above the upper end thereof directly in alinement with said bolt, in combination with the brake pipe pressure of an air brake system of said railway car which is tapped into said cylinder on one side of said piston, and spring means acting upon the other side of said piston for overcoming the brake line pressure when the same drops below a predetermined amount, substantially as and for the purpose specified.

4. In a pneumatic lock mechanism for car doors, an angle bracket adapted to be fixedly secured to the inside of a sliding car door, a bracket for attachment to the inside of a door jamb of a railway car, a T-shaped bolt slidably mounted in said bracket for overlying said angle bracket, a cylinder adapted to be mounted on the jamb beneath said bolt, a piston head slidable within said cylinder, a piston rod extending through one end of said cylinder for movement into the path of said bolt to lift the same, spring means acting upon said piston head to retain said piston rod in a retracted position, and an air inlet pipe entering the other end of said cylinder for the introduction of air under pressure into said cylinder to move said piston head and piston rod against the action of said spring means to lift said bolt to a locking position.

In testimony whereof I affix my signature.

WILLIAM R. HOBBS.